Figure 1:
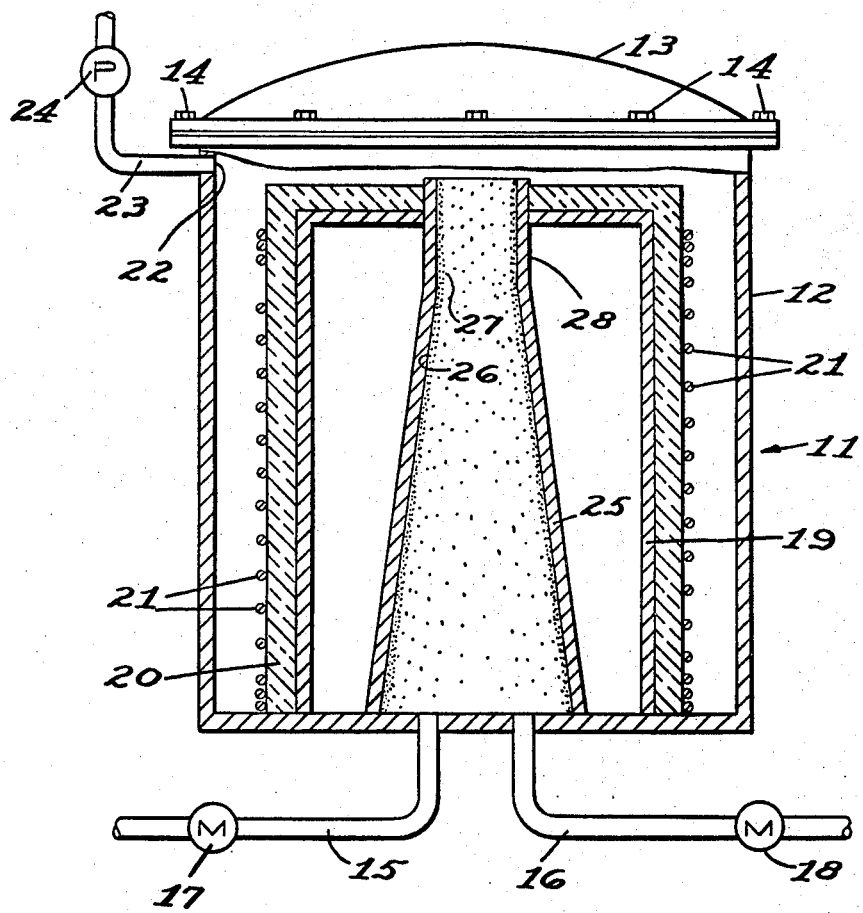

United States Patent
Clark et al.

[15] 3,673,051
[45] June 27, 1972

[54] PYROLYTIC GRAPHITE

[72] Inventors: Thomas J. Clark, Birmingham; Howard W. Brown, St. Clari Shores, both of Mich.

[73] Assignee: General Electric Company

[22] Filed: March 20, 1969

[21] Appl. No.: 833,218

Related U.S. Application Data

[63] Continuation of Ser. No. 520,213, Jan. 12, 1966, abandoned.

[52] U.S. Cl. ..................... 161/166, 117/46 CG, 117/106 R, 117/106 A, 117/106 C, 264/29
[51] Int. Cl. ..................... B32b 15/04, C01b 31/04
[58] Field of Search .......... 117/46 CB, 46 CC, 46 CG, 106 D, 117/106; 264/29; 161/166

[56] References Cited

UNITED STATES PATENTS

| | | | |
|---|---|---|---|
| 2,883,708 | 4/1959 | Sem | 117/46 CG |
| 3,156,091 | 11/1964 | Kraus | 117/46 CG |
| 3,369,920 | 2/1968 | Bourdeau et al. | 117/46 CC |
| 3,464,843 | 9/1969 | Basche | 117/46 CG |

FOREIGN PATENTS OR APPLICATIONS

| | | |
|---|---|---|
| 967,565 | Great Britain | 117/46 |

*Primary Examiner*—William D. Martin
*Assistant Examiner*—M. Sofocleous
*Attorney*—Harold J. Holt, Frank L. Neuhauser, Oscar B. Waddell and Melvin M. Goldenberg

[57] ABSTRACT

Curved pyrolytic graphite bodies of increased thickness-to-radius ratios are produced by codepositing with the pyrolytic graphite a refractory metal in progressively decreasing quantities from the outer to the inner surface of the body. The addition of the refractory alloy metal lowers the stress levels and hence permits greater thicknesses of the pyrolytic graphite body.

3 Claims, 2 Drawing Figures

INVENTORS
THOMAS J. CLARK
HOWARD W. BROWN
BY Harold J. Holt
ATTORNEY

PYROLYTIC GRAPHITE

This application is a continuation of application Ser. No. 520,213, filed Jan. 12, 1966, now abandoned.

This invention relates to pyrolytic graphite bodies of increased thickness-to-radius ratios and to a method of preparing such bodies.

Pyrolytic graphite is made by passing a carbonaceous gas at low pressure over an appropriate mandrel surface held at a high temperature, whereupon pyrolysis occurs and the pyrolytic graphite is vapor-deposited on the exposed mandrel surface. The pyrolytic graphite body so produced is highly anisotropic, i.e., its tensile strength and its thermal and erosion-oxidation resistance properties vary significantly depending on the crystallographic direction in which the properties are measured. Its unique properties make it useful as a structural material in industrial chemistry, high temperature thermal systems and in rocket systems.

Residual stresses occur in an anisotropic material at any temperature other than that at which the material is deposited. Normally, pyrolytic graphite part is deposited at very high temperatures and thus large residual stresses will be present when the part is at ambient temperatures. These stresses limit the thickness to which the pyrolytic graphite bodies may be deposited, a thickness measured in terms of the thickness/radius ratio of the pyrolytic graphite body. Normally, this ratio in the case of pure pyrolytic graphite bodies is limited to 0.05 or less. This obviously places considerable limitation upon the utilization of pyrolytic graphite materials.

It is an object of the present invention to increase the thickness/radius ratio of curved pyrolytic graphite bodies by a factor of two to three or even more. It is an additional object of the present invention to provide such increased thickness/radius ratios without sacrifice in any respect of the properties of the pyrolytic graphite bodies.

It has now been found that the thickness/radius ratio of pyrolytic graphite bodies may be significantly increased, or, conversely the stress level may be significantly reduced, by producing a graded pyrolytic graphite body having a proportionately small quantity of an alloy metal codeposited with the pyrolytic graphite body in successively decreasing quantities over at least a portion of the thickness of the body from the outer to the inner surface thereof. In its preferred form, the present invention comprises a pyrolytic graphite body having successively decreasing quantities of boron metal codeposited with the graphite ranging from about 1.5 percent boron in the outer surface, based on the total weight of graphite and boron, to about 0.01 percent boron in the inner surface of the pyrolytic graphite body.

Figure 2:
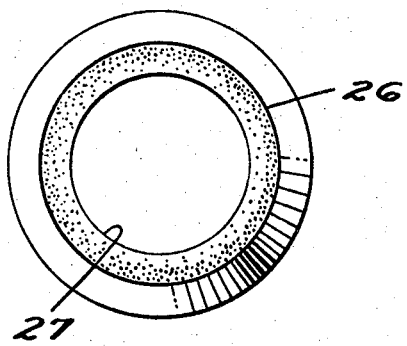

The invention will be better understood from the following description taken in connection with the accompanying drawing in which:

FIG. 1 is a sectional view of a deposition apparatus for forming pyrolytic bodies in accordance with the invention, and FIG. 2 is a sectional view of a pyrolytic graphite body made in accordance with the practice of this invention.

In FIG. 1, a deposition apparatus is shown which comprises a chamber 11 having a body portion 12 and a cover 13 which is attached to the body portion by means of bolts 14.

A feed line 15 extends through the bottom wall of chamber 11 to a source of carbonaceous gas (not shown). A second feed line 16 extends to a source of boron, as for example boron trichloride vapor. A meter 17 and a meter 18 in feed lines 15 and 16 measure the flow rate of source materials into the chamber.

An enclosure or susceptor 19 of graphite or other high temperature material is located within chamber 11. Suitable insulation 20 in the form of carbon black and conventional induction heating coils 21 surround the susceptor to provide heat during the deposition process. Chamber 11 is also provided with an outlet 22 to which is connected a line 23 associated with a vacuum pump 24 to reduce the pressure in chamber 11. A graphite mandrel 25, in the shape of a frustum of a cone, is positioned within susceptor 19.

Ordinarily, deposition will take place on the inner surface of the heated graphite mandrel, as would be the case in the apparatus shown in FIG. 1. If deposition does take place on an inner surface of the mandrel, then during the deposition process the amount of alloy metal (here boron) utilized will be decreased — either by stepwise or by gradual reduction in the amounts of alloy metal deposited during at least a portion of the deposition cycle. However, the alloy metal should preferably be codeposited throughout the deposition procedure; that is, the deposition procedure begins by codeposition of an alloy and ends with codeposition of an alloy, although the relative amounts of the alloy metal are considerably different from the beginning to the end of the deposition. A typical graded pyrolytic graphite body of the invention is shown in FIG. 2 in which the alloy content ranges from a maximum at outer diameter or surface 26 to a minimum at inner diameter 27.

The alloy metal should not be used in quantities great enough to form any detectable amount of carbide with the graphite. In the case of boron, boron is soluble to the extent of about one and a half percent by weight in the graphite. This is a measure of the maximum amount of boron that should be utilized in the codeposition procedure. It is believed that any non-soluble portion of the boron will form carbide with the graphite and not produce an acceptable pyrolytic graphite body. Other metals which are useful in carrying out the process of the present invention are in general the refractory metals of Groups IV, V and VI of the Periodic Table and their alloys and include, for example, hafnium, molybdenum, niobium, silicon-in unhypenated form tantalum, tungsten, titanium and zirconium.

A possible, although not yet completely established, theory upon which the present invention is based is as follows. A large difference in the thermal expansion coefficients exists between the plane parallel to the plane of deposition of pyrolytic graphite and a plane perpendicular to that direction. As a curved pyrolytic graphite body is cooled from its deposition temperature, this thermal anisotropy creates high stress levels in the pyrolytic graphite which fracture or delaminate the body and thus limit its thickness for a given radius of curvature. The addition of an alloyed metal in graded amounts to the pyrolytic graphite body, the amount decreasing from the outer to the inner surface of the body, gradually changes the coefficient of expansion of the body to compensate for the stresses set up by the anisotropy. Other factors which may be important are the strength, creep resistance, secondary anisotropy and modulus of the material, all of which are believed to vary as the amount of alloying metal is varied. In any event, regardless of the theory upon which the invention is based, it has been definitely established that the utilization of the inventive process produces a product with lower measured stress levels and considerably greater allowable thickness-to-radius ratios.

In general, the process of the invention is as follows. The deposition chamber 11 is evacuated to an initial pressure which is less than atmospheric and which may be as low as 0.1 mm. of mercury. The temperature of the chamber is brought to from 1,300° to 2,200° C. A carbon source, such as methane or natural gas and a small amount of a volatile alloy metal source ($BCl_3$, $HfCl_4$, $BF_3$, or other halides of the refractory metals), is fed into the evacuated chamber and the pressure adjusted to a value in the range of 0.5 – 10 millimeters of mercury, whereupon pyrolytic graphite and the alloy metal will be codeposited on heated mandrel 25. The amount of alloy metal content is gradually reduced, as for example by decreasing the amount of alloy metal from an initial value of about 1½ weight percent at the rate of 0.05 weight percent per hour over a deposition period of about 20 hours. This will result in a final value of alloy metal during deposition of about 0.5 weight percent.

The following is a specific example of the preparation of a pyrolytic graphite body in accordance with the present invention.

A deposition apparatus, as set forth in FIG. 1 of the drawing, was used. Boron trichloride as the source of boron was fed into chamber 11 through inlet tube 16. Natural gas, used as the source of carbon, was fed into chamber 11 through inlet tube 15.

After the cover 13 was bolted to the lower body portion 12 of the deposition chamber, the chamber atmosphere was evacuated initially to a pressure of 0.2 millimeters of mercury and maintained subsequently at a pressure of about 4.7 millimeters of mercury. Power was supplied to the induction coils to heat the enclosure to a temperature of about 2,100° C. The time and proportions of nat-ural gas and boron trichloride used in the course of the deposition cycle were as follows:

| Time Interval | Volume Ratio Natural Gas Boron Trichloride |
| --- | --- |
| 5.5 Hours | 52.2 |
| 7.5 Hours | 54.6 to 150* |
| 9.5 Hours | 171 |

*Increased in regular increments at 1/2-hour intervals.

The deposition was continued for a total period of about 22½ hours. Volume ratios are here given for the input as they are readily measured. The quantities of boron in the deposited body were measured at 0.6 weight percent in the outer surface and 0.5 percent in the inner surface. It is recognized, however, by those skilled in the art that exact determination cannot be made of boron weight percentages at these levels in pyrolytic graphite. The final thickness of the pyrolytic graphite-boron body as deposited was 0.217 inch at the narrow portion 28 of the deposit. The radius of curvature of the deposit at the same location was 2.496 inches. This meant that the thickness-to-radius ratio of the deposited pyrolytic graphite body was 0.087. The deposit was not cracked or delaminated, as would have been the case for a similar deposit of pyrolytic graphite having this thickness-to-radius ratio which had not been deposited with graded amounts of an alloy in accordance with the foregoing example. Tests indicated an inner fiber residual stress of 5,900 psi at location 28, the narrow portion of the deposit. In contrast, if the deposit were not alloyed and graded pyrolytic graphite, a value of about 7,000–7,200 psi is estimated for the residual stress. The latter values are extrapolated, as they are not observable directly because stress relief by cracking or delamination would occur before measurements could be made.

Cylinders have been made using processes substantially the same as the above example, adjusting the parameters of the process essentially only for shape, and acceptable deposits were obtained with thickness-to-radius ratios ranging from 0.10 to 0.15, or about two to three times the thickness-to-radius ratios obtainable with presently known practices.

What we claim as new and desire to secure by Letters Patent of the United States is:

1. A curved pyrolytic graphite body having codeposited therein an alloy element selected from the group consisting of boron, silicon, and metals of Groups IV, V and VI of the Periodic Table in a percent by weight of the deposit which over at least a portion of said body successively decreases from the outer to the inner radius thereof, the maximum amount of alloy element being insufficient to form any detectable amount of carbide with the graphite in said curved body.

2. The pyrolytic graphite body of claim 1 in which the alloy element is boron.

3. The pyrolytic graphite body of claim 2 in which the boron is present in quantities from 1.5 to 0.01 percent.

* * * * *